United States Patent
Oikawa

(10) Patent No.: US 7,992,394 B2
(45) Date of Patent: Aug. 9, 2011

(54) COLD TRAP AND COLD TRAP REGENERATION METHOD

(75) Inventor: Ken Oikawa, Tokyo (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 412 days.

(21) Appl. No.: 12/314,733

(22) Filed: Dec. 16, 2008

(65) Prior Publication Data

US 2009/0266088 A1   Oct. 29, 2009

(30) Foreign Application Priority Data

Apr. 25, 2008   (JP) ................................ 2008-116425

(51) Int. Cl.
   *B01D 8/00*   (2006.01)
(52) U.S. Cl. ....................................... 62/55.5; 417/901
(58) Field of Classification Search ................... 62/55.5, 62/51.1, 921; 417/901; 34/403
   See application file for complete search history.

(56) References Cited

U.S. PATENT DOCUMENTS 5,400,604 A * 3/1995 Hafner et al. .................. 62/55.5
5,582,017 A * 12/1996 Noji et al. ...................... 62/55.5

FOREIGN PATENT DOCUMENTS

| JP | 03-258976 A | 11/1991 |
| JP | 07-208332 A | 8/1995 |
| JP | 09-313920 A | 12/1997 |
| JP | 10-176664 A | 6/1998 |
| JP | 11-294330 A | 10/1999 |
| JP | 2001-123951 | 5/2001 |

OTHER PUBLICATIONS

JP OA, App. No. 2008-116425, Apr. 14, 2011 (4 pages); Engl translation (3 pages).
Office Action citing the Notification of Reasons for Refusal from Japan Patent Office (w/English translation) for application No. 2008-116425 mailed Apr. 20, 2010.

* cited by examiner

*Primary Examiner* — Chen-Wen Jiang
(74) *Attorney, Agent, or Firm* — Rader, Fishman & Grauer PLLC

(57) ABSTRACT

A cold trap is provided with a cold panel provided in a pumping path such that the panel is exposed, a refrigerator thermally coupled to the cold panel and operative to cool the cold panel; and a controller configured, in a regeneration process for evaporating a gas frozen on the surface of the cold panel and discharging the gas outside using the vacuum pump, to control the refrigerator so as to raise the temperature of the cold panel to a temperature exceeding a non-liquefaction temperature range and to adjust a pressure in the pumping path at the temperature so that the gas frozen on the surface of the cold panel is evaporated without being melted, the non-liquefaction temperature range being a range in which it is guaranteed that a gas frozen on the surface of the cold trap is evaporated without being melted.

16 Claims, 9 Drawing Sheets

| TEMPERATURE TABLE FOR 260 K TEMPERATURE CONTROL | | TEMPERATURE CONDITION | | |
|---|---|---|---|---|
| | | T<250K | 250K≦T<260K | T≧260K |
| OPERATION STATE OF REFRIG- ERATOR | SUSPEN- SION | REVERSE ROTATION OPERATION | — | NORMAL ROTATION OPERATION |
| | REVERSE ROTATION OPERATION | — | — | NORMAL ROTATION OPERATION |
| | NORMAL ROTATION OPERATION | REVERSE ROTATION OPERATION | — | — |

FIG.6

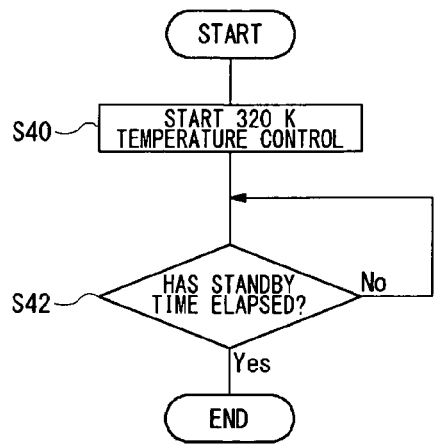

FIG.7

| PRESSURE TABLE FOR 320 K TEMPERATURE CONTROL | | PRESSURE CONDITION | | |
|---|---|---|---|---|
| | | P<80Pa | 80Pa≦P<100Pa | P≧100Pa |
| OPERATION STATE OF REFRIGERATOR | REVERSE ROTATION OPERATION | — | — | NORMAL ROTATION OPERATION |
| | NORMAL ROTATION OPERATION | REVERSE ROTATION OPERATION | — | — |

FIG.8

| TEMPERATURE TABLE FOR 320 K TEMPERATURE CONTROL | | TEMPERATURE CONDITION | | |
|---|---|---|---|---|
| | | T<310K | 310K≦T<320K | T≧320K |
| OPERATION STATE OF REFRIGERATOR | SUSPENSION | REVERSE ROTATION OPERATION | — | — |
| | REVERSE ROTATION OPERATION | — | — | SUSPENSION OF OPERATION |

FIG.9

| FINAL OUTPUT TABLE FOR 320 K TEMPERATURE CONTROL | | OUTPUT FROM TEMPERATURE TABLE | |
|---|---|---|---|
| | | SUSPENSION OF OPERATION | REVERSE ROTATION OPERATION |
| OUTPUT FROM PRESSURE TABLE | REVERSE ROTATION OPERATION | SUSPENSION OF OPERATION | REVERSE ROTATION OPERATION |
| | NORMAL ROTATION OPERATION | NORMAL ROTATION OPERATION | NORMAL ROTATION OPERATION | and captures the gas accordingly. The cold trap comprises: a cold panel provided in the pumping path such that the panel is exposed; a refrigerator thermally coupled to the cold panel and operative to cool the cold panel; and a controller configured, in a regeneration process for evaporating a gas frozen on the surface of the cold panel and discharging the gas outside using the vacuum pump, to control the refrigerator so as to raise the temperature of the cold panel to a temperature exceeding a non-liquefaction temperature range and to adjust, at the temperature exceeding a non-liquefaction temperature range, a pressure in the pumping path so that the gas frozen on the surface of the cold panel is evaporated without being melted, the non-liquefaction temperature range being a range in which it is guaranteed that a gas frozen on the surface of the cold trap is evaporated without being melted.
COLD TRAP AND COLD TRAP REGENERATION METHOD

BACKGROUND OF THE INVENTION

1. Field of the Invention

The present invention relates to a cold trap and a method of regenerating a cold trap.

2. Description of the Related Art

A cold trap is an apparatus for removing a gas from the environment by freezing and capturing the gas on its surface. Normally, a cooling apparatus such as a system for supplying a cooling fluid or a cryogenic refrigerator is provided in association with the cold trap so that the surface of the cold trap is cooled to a cryogenic temperature.

For example, patent document No. 1 describes using a cold trap in combination with a dry pump such as a turbomolecular pump. A cold trap is provided in the interior of a vacuum chamber pumped primarily by the dry pump. Gases with a smaller molecular weight such as water vapor are frozen and collected on the cold trap. Other gases with a relatively large molecular weight are pumped by the turbomolecular pump. According to the document, a high degree of vacuum is obtained as a result. A regeneration operation for melting and discharging the water molecules thus frozen and collected is performed after performing a pumping operation for a predetermined period of time. A coolant heated by a heater heats the cold trap. This causes the frozen and collected water vapor to be liquefied and drained via a drain pipe provided immediately below the cold trap.

[patent document No. 1] JP 9-313920

However, if the liquefied water or ice drops onto the turbomolecular pump, the turbomolecular pump may be adversely affected. In the worst case, the turbomolecular pump may be damaged. In another aspect, time required for regeneration for a cold trap represents a downtime for a vacuum chamber. Therefore, regeneration time is preferably as short as possible.

SUMMARY OF THE INVENTION

In this background, a general purpose of the present invention is to provide a cold trap and a method of regenerating a cold trap capable of ensuring that vacuum equipment such as a turbomolecular pump is less affected and reducing regeneration time.

An embodiment of the present invention relates to a cold trap. The cold trap is provided in a pumping path connecting a volume subject to pumping to a vacuum pump, causes a portion of a gas taken in from the volume to the vacuum pump via the pumping path to be frozen on the surface of the cold trap, and captures the gas accordingly. The cold trap comprises: a cold panel provided in the pumping path such that the panel is exposed; a refrigerator thermally coupled to the cold panel and operative to cool the cold panel; and a controller configured, in a regeneration process for evaporating a gas frozen on the surface of the cold panel and discharging the gas outside using the vacuum pump, to control the refrigerator so as to raise the temperature of the cold panel to a temperature exceeding a non-liquefaction temperature range and to adjust, at the temperature exceeding a non-liquefaction temperature range, a pressure in the pumping path so that the gas frozen on the surface of the cold panel is evaporated without being melted, the non-liquefaction temperature range being a range in which it is guaranteed that a gas frozen on the surface of the cold trap is evaporated without being melted.

According to this embodiment, the cold trap is regenerated at a relatively high temperature exceeding the non-liquefaction temperature. Therefore, regeneration time is reduced. Since the ambient pressure around the cold trap is controlled so that the ice captured on the surface of the cold trap is evaporated without being melted, equipment around the cold trap is prevented from being adversely affected due to liquid water.

The controller may control the refrigerator so that the pressure in the pumping path does not exceed the pressure at the triple point of the gas frozen on the cold panel.

The controller may control the refrigerator so that the pressure in the pumping path does not exceed a permissible inlet pressure of the vacuum pump.

When the pressure in the pumping path exceeds an upper limit pressure, the controller may return the pressure in the pumping path to a pressure equal to or below the upper limit pressure by cooling the cold panel.

When the pressure in the pumping path exceeds a permitted pressure range, the controller may cool the cold panel to a standby temperature selected from the non-liquefaction temperature range.

When the pressure in the pumping path falls below the permitted pressure range at the standby temperature, the controller may raise the temperature of the cold panel to a temperature exceeding the non-liquefaction temperature range.

The controller may raise the temperature of the cold panel at a slower rate at a temperature exceeding the non-liquefaction temperature range than at a temperature within the non-liquefaction temperature range.

The controller may raise the cold panel to a pressure determination temperature selected from the non-liquefaction temperature range and determine, after the temperature is raised, whether the pressure in the pumping path exceeds a reference pressure, and, when it is determined that the pressure in the pumping path exceeds the reference pressure, the controller may cool the cold panel to a temperature selected from the non-liquefaction temperature range, and, when it is determined that the pressure in the pumping path does not exceed the reference pressure, the controller may raise the temperature of the cold panel to a temperature exceeding the non-liquefaction temperature range.

The cold trap may further comprise a pressure sensor that includes in its measurement range the whole pressure range that could occur in the pumping path in the regeneration process, is provided to measure the pressure in the pumping path, and is connected to the controller so as to output a measured value to the controller. The controller may control the pressure in the pumping path based on the measured value from the pressure sensor.

Another embodiment of the present invention relates to a regeneration method. The cold trap regeneration method is for evaporating ice captured on the surface of a cold trap and discharging the ice outside. The method comprises: raising the temperature of the cold trap to a temperature exceeding a non-liquefaction temperature range in which it is guaranteed that ice frozen on the surface of the cold trap is evaporated without being melted; and controlling an ambient pressure around the cold trap at the temperature exceeding the non-liquefaction temperature range so that the ice frozen on the surface of the cold trap is evaporated without being melted.

The controlling may exercise control so that the ambient pressure around the cold trap does not exceed the pressure at the triple point of water.

The controlling includes discharging water vapor outside using a turbomolecular pump and controlling the ambient pressure around the cold trap so as not to exceed a permissible inlet pressure of the turbomolecular pump.

When the ambient pressure around the cold trap exceeds an upper limit pressure, the controlling may return the ambient pressure to a pressure equal to or below the upper limit pressure by cooling the cold trap.

When the ambient pressure around the cold trap exceeds a permitted pressure range, the controlling may cool the cold trap to a standby temperature selected from the non-liquefaction temperature range.

When the ambient pressure around the cold trap falls below the permitted pressure range at the standby temperature, the controlling may raise the temperature of the cold trap to a temperature exceeding the non-liquefaction temperature range.

The raising may raise the temperature of the cold trap at a slower rate at a temperature exceeding the non-liquefaction temperature range than at a temperature within the non-liquefaction temperature range.

The raising may raise the temperature of the cold trap to a pressure determination temperature selected from the non-liquefaction temperature range and determine, after the temperature is raised, whether the ambient pressure exceeds a reference pressure, and when it is determined that the ambient pressure exceeds the reference pressure, the ice may be allowed to sublimate at a temperature selected from the non-liquefaction temperature range and is discharged outside, and, when it is determined that the ambient pressure does not exceed the reference pressure, the temperature of the cold trap may be raised to a temperature exceeding the non-liquefaction temperature range.

A single pressure sensor may be operative to measure the ambient pressure around the cold trap since the start of the raising through the completion of the controlling.

Still another embodiment of the present invention relates to a regeneration controller. The regeneration controller is adapted to perform a regeneration process for evaporating a gas frozen on the surface of a cold trap and discharging the gas outside. The controller is operative to raise the temperature of the cold trap to a temperature exceeding a non-liquefaction temperature range and to control an ambient pressure around the cold trap at the temperature so that the gas frozen on the surface of the cold trap is evaporated without being melted, the non-liquefaction temperature range being a range in which it is guaranteed that a gas frozen on the surface of the cold trap is evaporated without being melted.

Yet another embodiment of the present invention relates to a regeneration method. The cold trap regeneration method is for evaporating a gas frozen on the surface of a cold trap and discharging the gas outside. The method comprises: monitoring an ambient pressure around the cold trap during regeneration; and temporarily cooling the cold trap when the ambient pressure thus monitored exceeds a permitted pressure range.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 is a flowchart illustrating the second temperature raising step according to the embodiment;

FIG. 7 shows an exemplary pressure table according to the embodiment;

FIG. 8 shows an exemplary temperature table according to the embodiment;

FIG. 9 shows an exemplary final output table according to the embodiment;

DETAILED DESCRIPTION OF THE INVENTION

Figure 1:
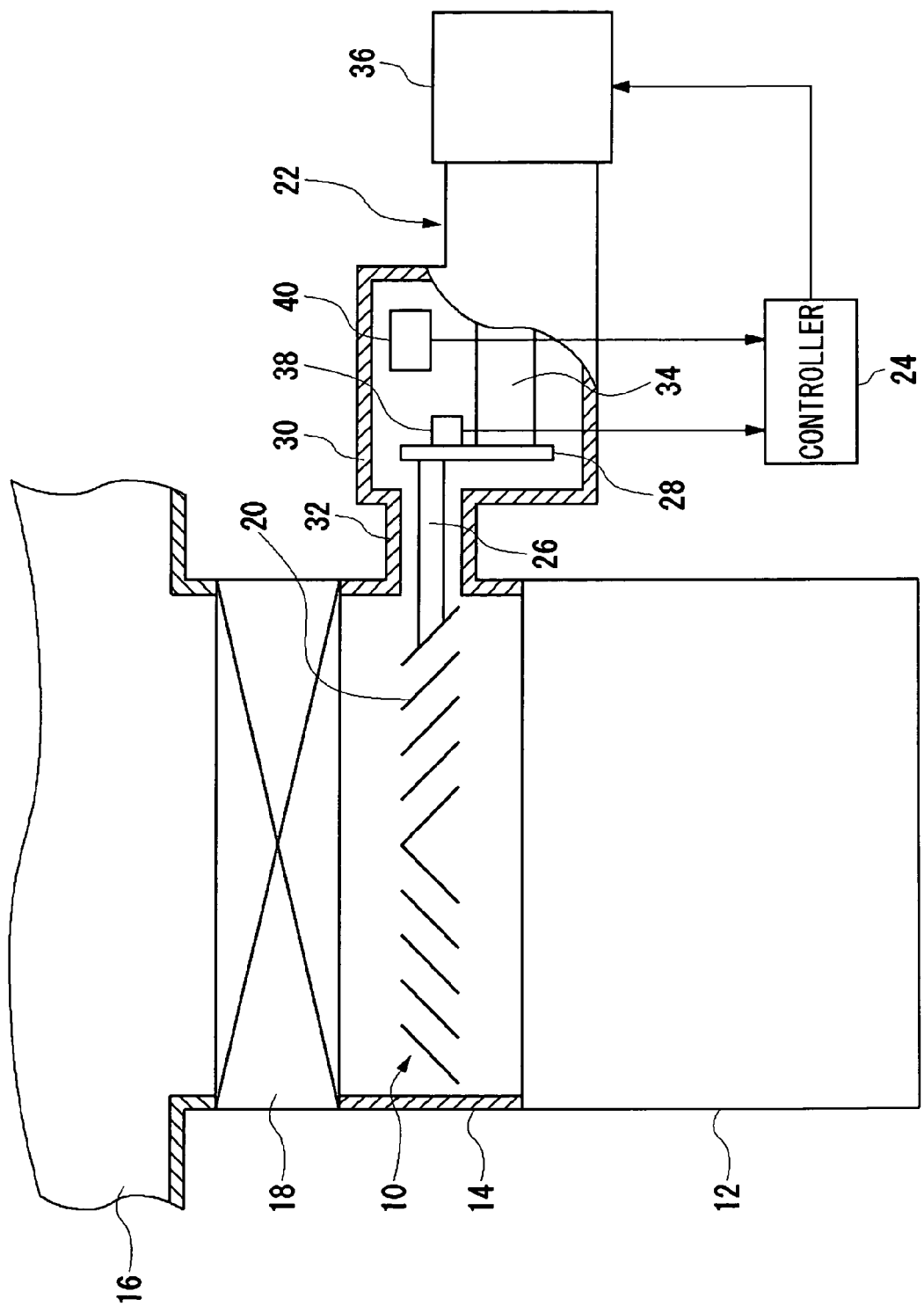
FIG. 1 schematically shows an evacuation system according to one embodiment of the present invention.

The invention will now be described by reference to the preferred embodiments. This does not intend to limit the scope of the present invention, but to exemplify the invention.

In one embodiment of the present invention, regeneration time is reduced by performing the regeneration of a cold trap at a high temperature. In a typical regeneration method, regeneration is performed at a low temperature (e.g., below 260 K) in order to evaporate a gas frozen on the surface of a cold trap, bypassing a liquid phase. Liquid phase is avoided in order to prevent vacuum equipment (e.g. a turbomolecular pump) in the neighborhood from being affected. In contrast, according to the embodiment, the ambient pressure around a cold trap being regenerated is adjusted to fall within a pressure range in which a frozen gas is evaporated without being melted. For this reason, regeneration can be performed at a high temperature while avoiding a liquid phase of the captured gas.

Further, in a typical regeneration method, once a cold trap is heated to a regeneration temperature, the regeneration temperature is maintained until pumping is completed. Nothing in the related art teaches a technical idea of cooling a cold trap during regeneration. In the embodiment, however, a cold trap is allowed to be cooled temporarily so that the ambient pressure around the cold trap does not reach a pressure at which the frozen gas can be melted. In this way, the rate of sublimation of the gas from the cold trap is reduced and the ambient pressure is prevented from being increased. We have experimentally verified that regeneration time is considerably reduced as compared with the related-art low-temperature regeneration by performing high-temperature regeneration in combination with temporary cooling of a cold trap.

In one embodiment of the present invention, a cold trap is provided with a controller for controlling a regeneration process. The controller raises the temperature of the cold trap to a temperature exceeding a non-liquefaction temperature range. With this, the gas frozen on the surface of the cold trap is evaporated again and discharged outside. In this process, the controller controls the ambient pressure so that the gas frozen on the surface of the cold trap is evaporated without being melted. The non-liquefaction temperature range is a temperature range in which it is guaranteed that the gas frozen on the surface of the cold trap is evaporated without melted. For example, the non-liquefaction temperature range is determined based on the phase diagram of the gas.

The controller controls the ambient pressure around the cold trap so as not to exceed a limit pressure. The limit pressure may be defined as a pressure at the triple point of the gas to be pumped. In the case of discharging the re-evaporated gas outside by means of a turbomolecular pump, the limit pressure may be equal to the permissible inlet pressure of the turbomolecular pump. A permissible inlet pressure is defined in the specification of a turbomolecular pump and denotes a maximum pressure permitted at the inlet of a turbomolecular pump. In order to ensure that the ambient pressure around the cold trap does not exceed the limit pressure, the controller controls the temperature of the cold trap so that the ambient pressure is maintained in a permitted pressure range defined by a predetermined upper limit pressure lower than the limit pressure and a predetermined lower limit pressure lower than the upper limit pressure.

In one embodiment, the controller performs a regeneration process by performing a temperature raising step of raising the temperature of the cold trap to a predetermined regeneration temperature, a discharging step of discharging the gas captured on the cold trap outside, and a cool-down step of re-cooling the cold trap in the stated order. The controller selects one of a plurality of predefined regeneration temperatures. The first regeneration temperature exceeding the non-liquefaction temperature range and the second regeneration temperature selected within the non-liquefaction temperature range may be at least established. For example, the first regeneration temperature may be set to be lower than the upper temperature limit of the refrigerator. The second regeneration temperature may be set to be equal to or slightly lower than the upper limit temperature of the non-liquefaction temperature range.

In the temperature raising step, the controller may raise the temperature of the cold trap to a pressure determination temperature so as to determine whether or not the ambient pressure around the cold trap exceeds a reference pressure. For example, the pressure determination temperature is selected from the non-liquefaction temperature range. The pressure determination temperature may be equal to the second regeneration temperature. For example, the reference pressure is set to be lower than the above-mentioned limit pressure. The reference pressure may be set to be equal to, for example, the upper limit pressure of the permitted pressure range. The controller may perform the discharging step at a temperature selected from the non-liquefaction temperature range (e.g., at the second regeneration temperature) when it is determined that the ambient pressure around the cold trap exceeds the reference pressure and may perform the discharging step at a temperature exceeding the non-liquefaction temperature range (e.g., at the first regeneration temperature) when it is determined that the ambient temperature around the cold trap does not exceed the reference pressure.

In the temperature raising step, the controller may raise the temperature at a slower rate at a temperature exceeding the non-liquefaction temperature range than in the non-liquefaction temperature range. For example, the rate of raising the temperature from the pressure determination temperature to the first regeneration temperature may be slower than the rate of raising the temperature to the pressure determination temperature. The controller may decrease the temperature raising rate in steps or continuously as the temperature is raised. The controller may monitor the ambient pressure around the cold trap and decrease the temperature raising rate when the ambient pressure exceeds a predetermined pressure. In this way, the ambient pressure around the cold trap is prevented from being increased abruptly in the temperature raising step. As a result, the gas frozen on the cold trap is prevented from being melted.

When the ambient pressure around the cold trap exceeds the upper limit pressure in the discharging step, the controller may cool the cold trap so as to return the ambient pressure to a pressure below the upper limit pressure. For example, the controller may cool the cold trap to a standby temperature when the ambient pressure around the cold trap exceeds the permitted pressure range. The controller may raise the temperature of the cold trap to a regeneration temperature (e.g., the first regeneration temperature) exceeding the non-liquefaction temperature range when the ambient pressure around the cold trap falls below the permitted pressure range at the standby temperature. In this way, the controller is permitted to temporarily cool the cold trap in the discharging step so as to maintain the ambient pressure around the cold trap within the permitted pressure range.

For example, the standby temperature is selected from the non-liquefaction temperature range. The standby temperature may be set to be equal to the second regeneration temperature. By ensuring that the standby temperature is low, the ambient pressure around the cold trap is promptly returned to the permitted pressure range. If, however, the upper limit value of the permitted pressure range of the ambient pressure around the cold trap is set to be sufficiently lower than the triple point pressure of the gas frozen on the cold trap, the standby temperature exceeding non-liquefaction temperature range may be selected. This is due to the fact that, if the upper limit value of the permitted pressure range is sufficiently lower than the triple point pressure, the gas frozen on the cold trap is not considered to be melted even when the ambient pressure exceeds the permitted pressure range. By maintaining the temperature of the cold trap at a high level, regeneration time is reduced accordingly. In this respect, it is preferable to optimally set the standby temperature by considering the controllability of the ambient pressure around the cold trap and an impact on the regeneration time.

For example, the cold trap according to the embodiment is an in-line cold trap. In other words, the cold trap is provided in a pumping path connecting the volume subject to pumping (e.g., a vacuum chamber) to a vacuum pump. The cold trap causes a portion of a gas taken in from the volume to the vacuum pump via the pumping path to be frozen on its surface and captures the gas accordingly. In this case, the pressure in the pumping path represents the ambient pressure around the cold trap. The vacuum pump may be implemented by a turbomolecular pump or a diffusion pump. In this case, the operating temperature of the cold trap is primarily set to capture water vapor. The turbomolecular pump may not only be operated for pumping. The pump may also be used while regenerating the cold trap in order to discharge the re-evaporated gas outside.

In one embodiment, the cold trap may be provided with a pressure sensor for measuring the ambient pressure. For example, the pressure sensor is provided to measure the pressure in the pumping path mentioned above. The pressure sensor may include in its measurement range the whole pressure range that could occur during the regeneration process. The sensor may be a crystal gauge. More specifically, the pressure sensor may include in its measurement range both a pressure for determining the completion of the discharging step and the above-mentioned upper limit pressure. The pressure sensor may monitor the ambient pressure around the cold trap from the beginning of the regeneration process through the completion thereof. The controller may adjust the temperature of the cold trap based on a measured value from the pressure sensor.

The cold trap according to the embodiment is provided with a cold panel operative to capture a gas on its surface, and a refrigerator thermally coupled to the cold panel and operative to cool the cold panel. The refrigerator according to the embodiment is capable of a normal operation (hereinafter, sometimes referred to as normal rotation operation) for cooling the cold panel and a reverse rotation operation for heating the cold panel. In a normal operation, the refrigerator produces refrigeration by a heat cycle whereby the operating gas taken inside is expanded and discharged. In a reverse rotation operation, heat is generated by a heat cycle produced by reversing the heat cycle in normal operation. The controller adjusts the temperature of the cold panel by switching between normal operation and reverse rotation operation of the refrigerator. The controller may adjust the temperature of the cold panel by controlling the frequency of heat cycles in normal operation and/or heat cycles in reverse rotation operation.

In one embodiment, the controller determines the operation state of the refrigerator so as to accommodate the temperature of the cold panel and the ambient pressure within a permitted range. However, if the ambient pressure around the cold panel deviates from the permitted pressure range, or it is predicted that the pressure will deviate, the controller may determine the operation state of the refrigerator giving priority to accommodating the ambient pressure around the cold panel within the permitted pressure range rather than accommodating the temperature of the cold panel within the permitted temperature range. For example, if the ambient pressure around the cold panel exceeds the permitted pressure range in the discharging step, the controller may switch the operation state of refrigerator from reverse rotation operation to normal operation so as to cool the cold panel to a temperature lower than the permitted temperature range. Alternatively, if the ambient pressure around the cold panel falls below the permitted pressure range, the controller may switch the operation state of the refrigerator from normal operation to reverse rotation operation so as to heat the cold panel to a temperature higher than the permitted temperature range.

A detailed description will now be given of the best mode of carrying out the invention with reference to the drawings. FIG. 1 schematically shows an evacuation system according to one embodiment of the present invention. The evacuation system is provided with a cold trap 10 and a turbomolecular pump 12. The turbomolecular pump 12 is connected to a vacuum chamber 16 of a vacuum processing apparatus via a pumping path 14. The cold trap 10 is provided in front of the turbomolecular pump 12 in the pumping path 14. The cold trap 10 is provided above the turbomolecular pump 12 in the vertical direction.

Further, a gate valve 18 for shielding the evacuation system from the vacuum chamber 16 is provided in the pumping path 14. The gate valve 18 is provided between the opening of the vacuum chamber 16 and the cold trap 10. By opening the gate valve 18, the evacuation system communicates with the vacuum chamber 16 for pumping. By closing the gate valve 18, the evacuation system is shielded from the vacuum chamber 16. When regenerating the cold trap 10, the gate valve 18 is normally closed. The gate valve 18 may constitute the evacuation system. Alternatively, the gate valve may be provided at the opening of the vacuum chamber 16 as part of the vacuum processing apparatus.

The cold trap 10 comprises a cold panel 20, a refrigerator 22, and a controller 24. The entirety of the cold panel 20 is exposed to the pumping path 14 and causes a portion of the gas flowing in the pumping path 14 to be frozen on its surface and captures the gas accordingly. The cold panel 20 is provided in a plane perpendicular to the direction of gas flow in the pumping path 14 (the vertical direction in FIG. 1). The area of the cold panel 20 projected along the direction of gas flow in the pumping path 14 is set so as to occupy the majority of the cross sectional area perpendicular to the direction of gas flow.

The cold panel 20 is a louver having a plurality of metallic vanes. The vanes are formed like sides of truncated cones having different diameters and are concentrically arranged. The cold panel 20 may be in a chevron formation or may form a lattice or other shape.

The cold panel 20 is thermally coupled to a cooling stage 28 of the refrigerator 22 by a heat transfer member 26 projecting from the circumference of the panel. An opening is formed in the pumping path 14 at a position coinciding with the heat transfer member 26. Mounted in the opening is a coupling housing 32 that accommodates the heat transfer member 26 and connects the pumping path 14 to a refrigerator housing 30. The coupling housing 32 hermetically connects the interior space of the pumping path 14 to the interior space of the refrigerator housing 30. This results in the internal pressure of the refrigerator housing 30 being equal to the pressure in the pumping path 14.

The refrigerator 22 is a Gifford-McMahon refrigerator (so-called a GM refrigerator). The refrigerator 22 is a single-stage refrigerator and is provided with the cooling stage 28, a cylinder 34, and a refrigerator motor 36. The refrigerator stage 28 is mounted at one end of the cylinder 34. The refrigerator motor 36 is provided at the other end of the cylinder 34. A displacer (not shown) is built in the cylinder 34 and a regenerator is built in the displacer. The refrigerator motor 36 is connected to the displacer so that the displacer can make a reciprocal movement inside the cylinder 34. The refrigerator motor 36 is also connected to a movable valve (not shown) provided inside the refrigerator 22 so as to drive the valve into normal and reverse rotation.

A compressor (not shown) is connected to the refrigerator 22 via a high-pressure pipe and a low-pressure pipe. The refrigerator 22 produces refrigeration in the cooling stage 28 and the cold panel 20 by repeating heat cycles whereby a high-pressure operating gas (e.g., helium) supplied from the compressor is expanded inside the refrigerator 22 and then discharged. The refrigerator motor 36 rotates the movable valve in a predetermined direction so as to achieve the heat cycle. The compressor collects the operating gas discharged from the refrigerator 22 and increases its pressure before supplying it the refrigerator 22 again. By allowing the refrigerator motor 36 to rotate the movable valve in a reverse direction, a heat cycle produced by reversing the above heat cycle is achieved so that the cooling stage 28 and the cold panel 20 are heated. Instead of or in addition to reverse rotation operation of the refrigerator 22, the cooling stage 28 or the cold panel 20 may be heated by using a heating means such as a heater.

A temperature sensor 38 is provided in the cooling stage 28 of the refrigerator 22. The temperature sensor 38 periodically measures the temperature of the cooling stage 28 and outputs a signal indicating the measured temperature to the controller 24. The temperature sensor 38 is connected to the controller 24 so that an output of the sensor can be communicated to the controller 24. The cooling stage 28 and the cold panel 20 are formed as one piece thermally. Therefore, the measured temperature from the temperature sensor 28 indicates the temperature of the cold panel 20. The temperature sensor 38 may be provided in the cold panel 20 or in the transfer member 26.

A pressure sensor 40 is provided inside the refrigerator housing 30. The pressure sensor 40 periodically measures the internal pressure of the refrigerator housing 30, i.e., the pressure in the pumping path 14, and outputs a signal indicating the measured pressure to the controller 24. The pressure sensor 40 is connected to the controller 24 so that an output of the sensor can be communicated to the controller 24. The pressure sensor 40 may measure the pressure only during a regeneration process of the cold trap 10 and output the result to the controller 24. The measured value from the pressure sensor 40 indicates the pressure around the cold panel 20, i.e., the ambient pressure. The pressure sensor 40 may be provided inside the housing 32 or in the pumping path 14.

The pressure sensor 40 has a wide measurement range extending from atmospheric pressure to about 0 Pa. Desirably, the sensor 40 includes in its measurement range at least a pressure range that could occur during a regeneration process. Desirably, the pressure sensor 40 is a pressure sensor at least capable of measuring a pressure occurring when the gas flow in the pumping path 14 is a viscous flow. The pressure sensor 40 may be a sensor also capable of measuring a pressure irrespective of whether the gas flow in the pumping path 14 is a viscous flow or a molecular flow. Generally, the gas flow will be a viscous flow if the pressure in the pumping path 14 is higher than several Pa. The gas flow will be a molecular flow if the pressure is smaller than $10^{-1}$-$10^{-2}$ Pa. In the embodiment, it is preferable to use, for example, a crystal gauge as a sensor that meets the requirement. A crystal gauge is a sensor for measuring a pressure by using a phenomenon whereby vibration resistance of a crystal oscillator varies with pressure. A Baratron vacuum gage may be used alternatively. In a typical, related-art cold trap, there is not provided a pressure sensor, or a pressure sensor capable of measuring only the pressure of a molecular flow is used (e.g., a T/C gauge).

The controller 24 is formed as a microprocessor including a CPU. In addition to the CPU, the controller 24 is provided with a ROM for storing programs, a RAM for temporarily storing data, an input and output port, and a communication port. The controller 24 is connected to the controller of the vacuum processing apparatus and capable of communicating therewith. The controller 24 is also capable of executing proper control in accordance with an instruction from the controller of the vacuum processing apparatus. The controller 24 controls the refrigerator 22 based on the measured value fed from the temperature sensor 38 and the pressure sensor 40. The controller 24 is connected to the refrigerator motor 36 of the refrigerator 22 and capable of communicating therewith. An inverter (not shown) is provided between the controller 24 and the refrigerator motor 36. The revolution of the refrigerator motor 36 is controlled by supplying an instruction from the controller 24 to the inverter. By changing the revolution of the refrigerator motor 36, the frequency of heat cycles in the refrigerator 22 is changed so that the temperature of the cooling stage 28 and the cold panel 20 varies.

The evacuation system shown in FIG. 1 alternately repeats a pumping process and a regeneration process. In a pumping process, the vacuum chamber 16 is evacuated to increase the degree of vacuum to a desired level by opening the gate valve 18 and operating the turbomolecular pump 12. In this process, the cold trap 10 is cooled to a temperature (e.g., 100 K) capable of capturing water vapor flowing in the pumping path 14. Normally, the pumping speed of the turbomolecular pump 12 for pumping water vapor is relatively low. However, a larger pumping speed is achieved by using the cold trap 10 in combination.

In a pumping process, the controller 24 controls the refrigerator motor 36 based on the measured temperature from the temperature sensor 38 so that the temperature of the cold panel 20 matches a target temperature (e.g., 100 K). For example, the controller 24 determines the revolution of the refrigerator motor 36 so that an error between the measured temperature from the temperature sensor 38 and the target temperature is minimized. For example, the controller 24 increases the revolution of the refrigerator motor 36 when the measured temperature exceeds the target temperature and decreases the revolution of the refrigerator motor 36 when the measured temperature falls below the target temperature. In this way, the temperature of the cold panel 20 is maintained at the target temperature.

As the pumping process is continued, the frozen gas is collected on the cold trap 10. What mainly occurs in the embodiment is that the amount of ice formed by solidified water vapor is mainly increased. Thus, for the purpose of discharging the ice thus collected outside, the cold trap 10 is regenerated after an elapse of a predetermined time since the start of the pumping process. Regeneration is normally performed by closing the gate valve 18 and isolating the cold trap 10 from the vacuum chamber 16 accordingly. The temperature of the cold trap 10 is raised to a regeneration temperature higher than the cold trap temperature occurring during the pumping process so as to re-evaporate the gas frozen on the surface. The re-evaporated gas is discharged outside by operating the turbomolecular pump 12. It will also be possible to provide a vacuum pump other than the turbomolecular pump for the purpose of regeneration and to use the vacuum pump to discharge the gas outside.

Figure 2:
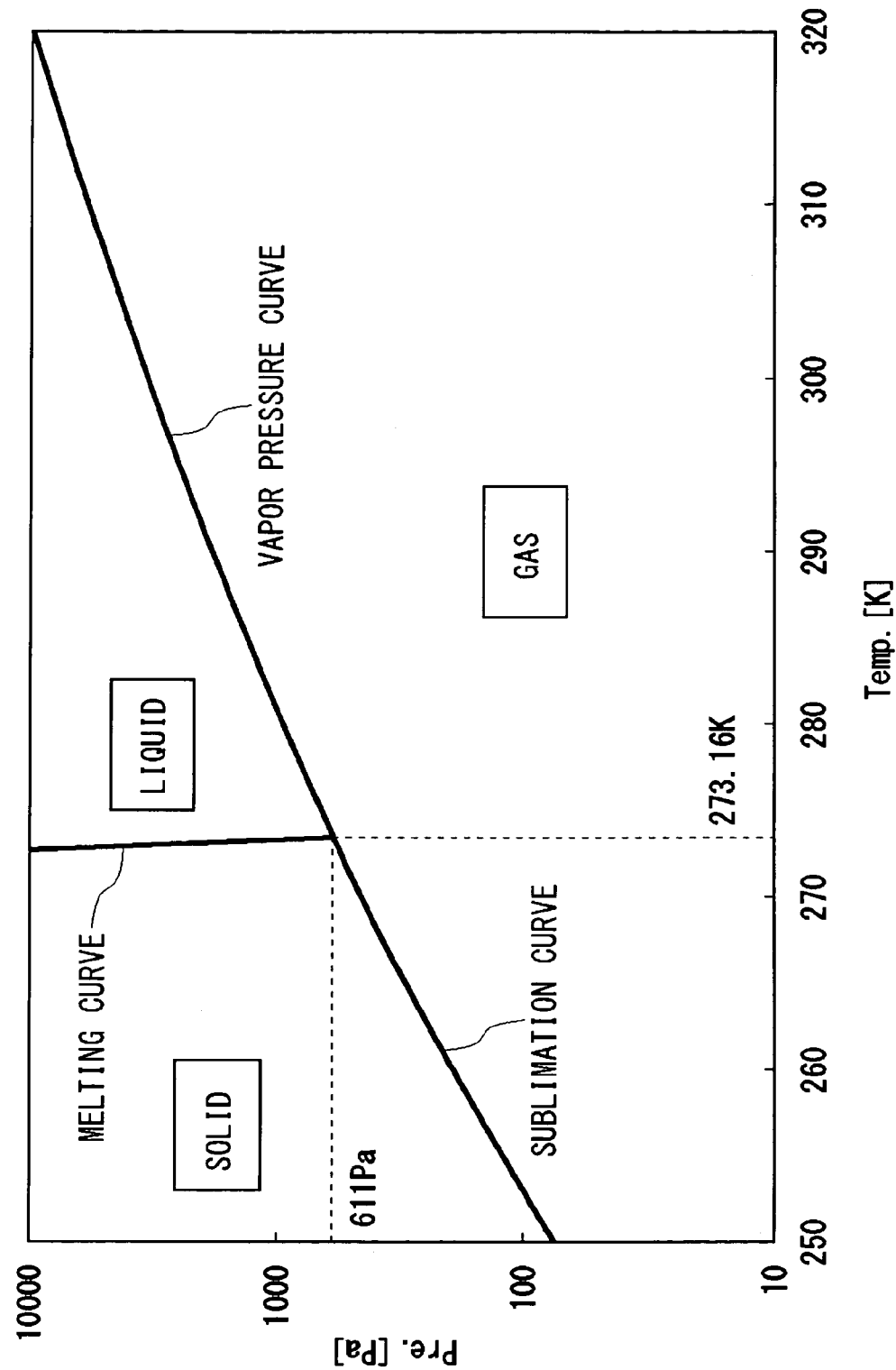
FIG. 2 is a phase diagram of water.

In the regeneration process according to the embodiment, the pressure in the pumping path 14 is monitored and controlled not to exceed the limit pressure from the start of the regeneration process through the completion thereof. For example, the limit pressure may be equal to the triple point pressure. In the embodiment, the cold trap 10 primarily pumps moisture. Therefore, the triple point pressure of water may be set as the limit pressure. FIG. 2 is a phase diagram of water. FIG. 2 shows that the triple point pressure of water is 611 Pa. Accordingly, the limit pressure may be set to 611 Pa. In this way, the pressure during regeneration is controlled to be equal to or below the triple point pressure so that the ice is allowed to sublimate directly. Since a liquid phase is not allowed, it is ensured that water or ice does not drop onto the turbomolecular pump 12 provided immediately below the cold trap 10. Accordingly, the turbomolecular pump 12 is prevented from being damaged. Another potential concern is that liquid water may produce a hazardous composition as a result of chemical reaction with another captured gas. By preventing liquid water from being produced, the likelihood of producing a hazardous composition is also reduced.

The limit pressure may alternatively be set to the permissible inlet pressure of the turbomolecular pump 12. For example, the permissible inlet pressure of the turbomolecular pump 12 is about several Pa or on the order of 10-100 Pa. The permissible inlet pressure may be 100-200 Pa. In the embodiment, the permissible inlet pressure is, for example, 100 Pa. If the permissible inlet pressure of the turbomolecular pump 12 is lower than the triple point pressure of the gas to be pumped by the cold trap 10, it is preferable to set the limit pressure to the permissible inlet pressure. In this way, the interior of the turbomolecular pump 12 is prevented from being overheated during a regeneration process.

Figure 3:
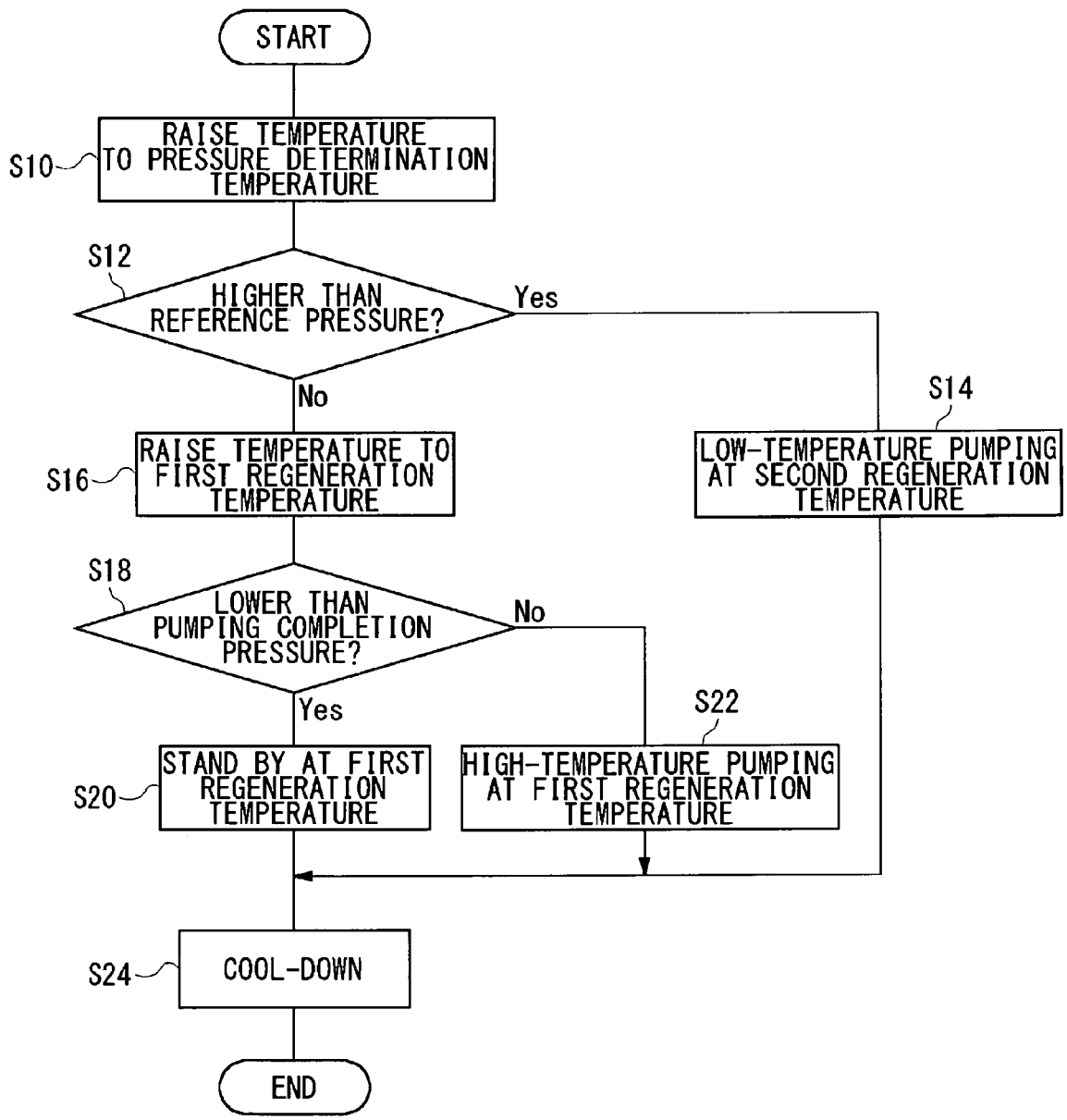
FIG. 3 is a flowchart illustrating the regeneration process according to the embodiment.

FIG. 3 is a flowchart illustrating the regeneration process according to the embodiment. The process shown in FIG. 3 is started when an instruction for starting a regeneration process is fed to the controller 24. The instruction for staring a regeneration process is generated by, for example, the controller of the vacuum processing apparatus and fed to the controller 24. Alternatively, the instruction for starting a regeneration process may be directly fed from an input interface provided in association with the controller 24 to the controller 24. The controller 24 may be configured to start the regeneration process after an elapse of predetermined delay time since the reception of the instruction for starting a regeneration process.

The controller 24 performs the first temperature raising step (S10). In the first temperature raising step, the controller 24 raises the temperature of the cold panel 20 to a pressure determination temperature. The pressure determination temperature is a temperature selected from the non-liquefaction temperature range and is predefined by and stored in the controller 24. In the embodiment, the pressure determination temperature is set to, for example, 260 K. The first temperature raising step will be described later in further detail with reference to FIGS. 4 and 5.

The non-liquefaction temperature range of water can be defined by referring to the phase diagram shown in FIG. 2. The non-liquefaction temperature range of water is a temperature range in which it is guaranteed that ice on the surface of the cold panel 20 evaporates by sublimation in a pressure range that occur during a regeneration process. The non-liquefaction temperature range of water may be defined as a temperature range equal to or below 270 K based on the phase diagram of water. Since the gradient of the melting curve is negative in the case of water as shown in FIG. 2, it is preferable to define the non-liquefaction temperature range as being a range below a temperature slightly lower than 273.16 K, which is the triple point temperature. In the case of a gas with a positive gradient of the melting curve, the non-liquefaction temperature range may be defined as a range below the triple point temperature.

Following the first temperature raising step, the controller 24 performs the first pressure determination step (S12). The controller 24 determines whether the ambient pressure around the cold trap occurring after the first temperature raising step is higher than the reference pressure. The reference pressure is predefined by and stored in the controller 24. The reference pressure may be set to be equal to the limit pressure mentioned above. Alternatively, the reference pressure may be set to lower than the limit pressure by an appropriate margin. In the embodiment, the reference pressure is set to, for example, 100 Pa, which is the permissible inlet pressure of the turbomolecular pump 12.

If it is determined that the ambient pressure around the cold trap occurring after the first temperature raising step is higher than the reference pressure (Yes in S12), the controller 24 performs a low-temperature pumping step (S14). In other words, the controller 24 continues the regeneration process at the second regeneration temperature selected from the non-liquefaction temperature range. In this case, the ambient pressure around the cold trap is considerably high so that priority is given to preventing liquid water from being produced rather than to reducing regeneration time, by maintaining the non-liquefaction temperature range. For example, the second regeneration temperature may be set to be equal to the pressure determination temperature. Thus, the second regeneration temperature is set to 260 K in the embodiment. In order to reduce regeneration time, the second regeneration temperature is preferably set to the upper limit temperature of the non-liquefaction temperature range or a temperature lower than the upper limit temperature by a predetermined margin. The margin may be appropriately set in consideration of temperature control error or heat transfer property, so as not to deviate from the non-liquefaction temperature range at any position on the cold panel 20. When the low-temperature pumping step is completed, the controller 24 performs a cool-down step (S24), thereby completing the regeneration process.

If it is determined that the ambient pressure around the cold trap occurring after the first temperature raising step is equal to or lower than the reference pressure (No in S12), the controller 24 performs the second temperature raising step (S16). In the second temperature raising step, the controller raises the temperature of the cold panel 20 from the pressure determination temperature to the first regeneration temperature. The first regeneration temperature is a temperature that exceeds the non-liquefaction temperature range and is predefined by and stored in the controller 24. In the embodiment, the first regeneration temperature is set to, for example, 320 K. It is preferable that the first regeneration temperature be lower than the upper temperature limit of the refrigerator 22. Desirably, the first regeneration temperature is set to a temperature lower than the refrigerator's upper temperature limit by a predetermined margin. The margin may be appropriately set in consideration of temperature control error or heat transfer property, so as not to exceed the upper temperature limit at any position in the refrigerator 22. The second temperature raising step will be described later in further detail with reference to FIGS. 6 through 9.

The controller 24 may raise the temperature at a higher rate in the first temperature raising step than in the second temperature raising step. By raising the temperature at a higher rate in the first temperature raising step, reduction in regeneration time is achieved. By raising the temperature slowly in the second temperature raising step, abrupt increase in the ambient pressure around the cold trap is prevented. More specifically, the controller 24 decreases the heat cycle frequency of the refrigerator 22 in the second temperature raising step as compared to the first temperature raising step. In other words, the controller 24 decreases the revolution of the refrigerator motor 36 in the second temperature raising step as compared to the first temperature raising step.

Following the second temperature raising step, the controller 24 performs the second pressure determination process (S18). The controller 24 determines whether the ambient pressure around the cold trap occurring after the second temperature raising step is lower than a pumping completion pressure. The pumping completion pressure is predefined by and stored in the controller 24. In the embodiment, the pumping completion pressure is set to, for example, 5 Pa. The pumping completion pressure is a pressure at which it is considered that the gas stored in the cold trap 10 is completely pumped and can be appropriately set empirically or experimentally. In order to measure the pressure with a good precision, it is preferable to set the pumping completion pressure at a value larger than the minimum measurable pressure of the pressure sensor 40 used.

If it is determined that the ambient pressure around the cold trap occurring after the second temperature raising step is lower than the pumping completion pressure (Yes in S18), the controller 24 stands by for a predetermined period of time at the first regeneration temperature (S20), performs a cool-down step (S24), and completes the regeneration process. If the ambient pressure is lower than the pumping completion pressure, it means that the gas is completed discharged. Therefore, the regeneration process may be terminated. By standing by for a predetermined period of time at the first regeneration temperature, whatever ice that remains on the cold panel 20 is discharged. In the embodiment, the controller 24 stands by for several to ten minutes. If reduction of regeneration time is given priority, the standby time may not be provided. In the cool-down step, the controller 24 cools the cold panel 20 to a panel target temperature defined for the pumping process (e.g., 100 K). The cool-down step will be described later in further detail with reference to FIG. 11.

If it is determined that the ambient pressure abound the cold trap occurring after the second temperature raising step is higher than the pumping completion pressure (No in S18), the controller 24 performs a high-temperature pumping step (S22). In the high-temperature pumping step, the controller 24 continues the regeneration process at the first regeneration temperature higher than the non-liquefaction temperature range. However, if the ambient pressure around the cold trap exceeds the permitted range, the ambient pressure is returned to the permitted range by temporarily cooling the cold panel 20. The high-temperature pumping step will be described later in further detail with reference to FIG. 10. When the high-temperature pumping step is completed, the controller 24 performs a cool-down step (S24) and completes the regeneration process.

Figures 4, 5:
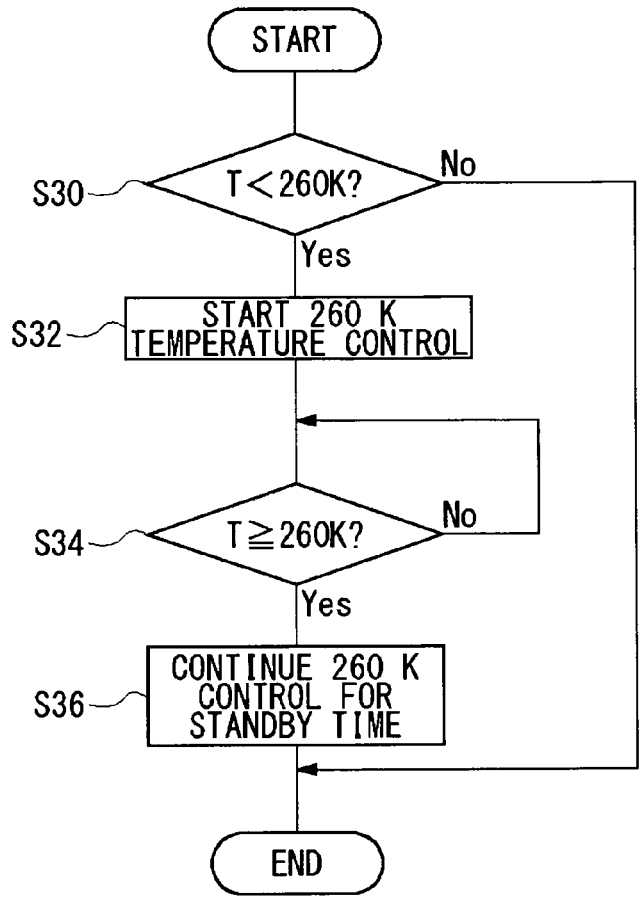
FIG. 4 is a flowchart illustrating the first temperature raising step according to the embodiment.
FIG. 5 shows an exemplary temperature table according to the embodiment.

FIG. 4 is a flowchart illustrating the first temperature raising step (S10 of FIG. 3) according to the embodiment. The controller 24 determines whether the cold panel temperature T exceeds the pressure determination temperature (e.g., 260 K) (S30). If it is determined that the cold panel temperature T exceeds the pressure determination temperature (No in S30), the controller 24 terminates the first temperature raising step and performs the first pressure determination process (S12 of FIG. 3). In other words, the first temperature raising step is omitted. For example, when the regeneration process is started when a long period of time has elapsed since the completion of the pumping operation of the evacuation system, the cold panel temperature may rise naturally to a level exceeding the pressure determination temperature. In such a case, regeneration time can be reduced by omitting the first temperature raising step.

If it is determined that the cold panel temperature T is equal to or below the pressure determination temperature (Y in S30), the controller 24 starts temperature control wherein the pressure determination temperature is the target temperature (S32). Such temperature control may be referred to as low-temperature control hereinafter. Since the pressure determination temperature is 260 K in the embodiment, such temperature control may be referred to as 260 K temperature control. The controller 24 determines whether the cold panel temperature T has reached 260 K since the start of 260 K temperature control (S34). If it is determined that the cold panel temperature T has not reached 260 K (No in S34), the controller 24 determines whether the cold panel temperature T has reached 260 K at a subsequent point of time in the control schedule (S34).

If it is determined that the cold panel temperature T is equal to or higher than 260 K (Yes in S34), the controller 24 continues 260 K temperature control for a predetermined standby time (S36). The standby time is provided because it is considered that an increase in the ambient pressure around the cold trap is delayed with respect to an increase in the cold panel temperature. Therefore, the standby time may be set empirically or experimentally considering a delay in the rise of the ambient pressure around the cold trap. In the embodiment, the standby time may be set to several to ten minutes. The controller 24 terminates the first temperature raising step after an elapse of the standby time and performs the first pressure determination process.

The controller 24 performs 260 K temperature control in accordance with, for example, a temperature table shown in FIG. 5. The controller 24 determines the operation state of the refrigerator 22 based on the current operation state and the current cold panel temperature T. More specifically, the controller 24 determines whether to drive the refrigerator 22 into reverse rotation operation, suspension of operation, or normal rotation operation, and determines the operating frequency of the refrigerator 22 as well. The controller 24 turns the determination into an operation instruction and outputs the same to the refrigerator motor 36. Referring to FIG. 5, notation "-" indicates that the current operation state. The same is true of the other diagrams.

According to the temperature table shown in FIG. 5, the controller 24 determines the operation state of the refrigerator 22, distinguishing between whether the cold panel temperature T falls below the permitted temperature range, whether the temperature T is within the permitted temperature range, or whether the temperature T exceeds the permitted temperature range. The permitted temperature range is defined so as to provide a predetermined temperature margin above and below the target temperature of temperature control. In the embodiment, the target temperature of temperature control is 260 K. Therefore, the permitted temperature range is defined as 250-260 K, providing a 10 K temperature margin. In this example, the target temperature represents the upper limit temperature of the permitted temperature range. Alternatively, a permitted temperature range may be defined around the target temperature range or the target temperature may be the lower limit temperature of the permitted temperature range.

If the cold panel temperature T falls below the permitted temperature range, i.e., below 250 K (the left column of FIG. 5), the controller 24 drives the refrigerator into reverse rotation operation regardless of the current operation state of the refrigerator. If the cold panel temperature T is within the permitted temperature range, i.e., 250 K$\leq$T<260 K (the center column of FIG. 5), the operation state is continued regardless of the current operation state of the refrigerator. If the cold panel temperature T exceeds the permitted temperature range, i.e., equal to or higher than 260 K (the right column of FIG. 5), the controller 24 drives the refrigerator into normal rotation operation regardless of the current operation state of the refrigerator. In this way, the temperature of the cold panel is raised by reverse rotation operation if the cold panel temperature T falls below the permitted temperature range. If the cold panel temperature T exceeds the permitted temperature range, the cold panel is cooled by normal rotation operation.

The controller 24 may operate the refrigerator 22 at a higher operating frequency in reverse rotation operation than in normal rotation operation. Preferably, the controller 24 may operate the refrigerator 22 at the maximum operating frequency during reverse rotation operation. In this way, the cold panel temperature is raised to a target temperature (e.g., the pressure determination temperature) rapidly. In the embodiment, the refrigerator 22 may be operated at the minimum operating frequency during normal rotation operation. This is due to the fact that the target temperature is low so that the panel temperature is likely to drop. In this regard, instead of driving the refrigerator 22 into normal rotation operation, the operation of the refrigerator 22 may be suspended.

Thus, when 260 K temperature control is started in the first temperature raising step according to the embodiment, the temperature of the cold panel 20 is rapidly raised to 260 k, which is the pressure determination temperature, by driving the refrigerator 22 into reverse rotation operation to produce the maximum output. When the temperature is raised to 260 K, the refrigerator 22 is switched to normal rotation operation, cooling the panel to 250 K. When the temperature reaches 250 K, the temperature is raised to 260 K again. The steps will be repeated until the standby time elapses.

FIG. 6 is a flowchart illustrating the second temperature raising step (S16 of FIG. 3) according to the embodiment. If it is determined in the first pressure determination process (S12 of FIG. 3) that the ambient pressure around the cold trap is equal to lower than the reference pressure (No in S12 of FIG. 3), the controller 24 starts temperature control wherein the first regeneration temperature is the target temperature (S40). Such temperature control may be referred to as high-temperature control hereinafter. Since the first regeneration temperature is 320 K in the embodiment, such temperature control may be referred to as 320 K temperature control.

The controller 24 continues 320 K temperature control for a predetermined standby time. The controller 24 determines whether the standby time has elapsed since the start of 320 K temperature control (S42). The standby time is provided because it is considered that an increase in the ambient pressure around the cold trap is delayed with respect to an increase in the cold panel temperature. Therefore, the standby time may be set empirically or experimentally considering a delay in the rise of the ambient pressure around the cold trap. In the embodiment, the standby time may be set to several to minutes.

If it is determined that the standby time has not elapsed (No in S42), the controller 24 determines whether the standby time has elapsed at a subsequent point of time in the control schedule (S42). If it is determined that the standby time has elapsed (Yes in S42), the controller 24 performs the second pressure determination process (S18) of FIG. 3). Since 320 K temperature control raises the temperature relatively slowly, the cold panel temperature may not have reached 320 K when the standby time has elapsed.

The controller 24 performs 320 K temperature control in accordance with control tables shown in FIGS. 7 through 9. FIG. 7 shows a pressure table for 320 K temperature control and FIG. 8 shows a temperature table for 320 K temperature control. FIG. 9 shows a final output table for determining a final output. In 320 K temperature control, the controller 24 uses the temperature table and the pressure table so as to output the operation state of the refrigerator 22. The controller 24 then uses the final output table so as to determine one of the output from the temperature table and the output from the pressure table as the final output. The controller 24 controls the refrigerator 22 in accordance with the final output thus determined.

According to the pressure table shown in FIG. 7, the controller 24 determines the operation state of the refrigerator 22, distinguishing between whether the ambient pressure P around the cold trap falls below the permitted pressure range, whether the pressure P is within the permitted pressure range, or whether the pressure P exceeds the permitted pressure range. For example, the upper limit of the permitted pressure range is set to be equal to or lower than the limit pressure. The lower limit of the permitted pressure range may be set to be lower than the upper limit by a predetermined pressure margin. Since the limit pressure is 100 Pa according to the embodiment, the upper limit and the lower limit of the permitted pressure range are set to 100 Pa and 80 Pa, respectively.

If the ambient pressure P around the cold trap falls below the permitted pressure range, i.e., below 80 Pa (the left column of FIG. 7), the controller 24 drives the refrigerator into reverse rotation operation regardless of the current operation state of the refrigerator. If the ambient pressure P around the cold trap is within the permitted pressure range, i.e., 80 Pa$\leq$P<100 Pa (the center column of FIG. 7), the operation state is continued regardless of the current operation state of the refrigerator. If the ambient pressure P around the cold trap exceeds the permitted pressure range, i.e., equal to or higher than 100 Pa (the right column of FIG. 7), the controller 24 drives the refrigerator into normal rotation operation regardless of the current operation state of the refrigerator. In this way, the temperature of the cold panel is raised and the pressure is increased by reverse rotation operation if the ambient pressure P around the cold trap falls below the permitted pressure range. If the ambient pressure P around the cold trap exceeds the permitted pressure range, the cold panel is cooled and the pressure is decreased by normal rotation operation.

In normal rotation operation of the refrigerator 22 performed when the ambient pressure P around the cold trap exceeds the permitted pressure range, the controller 24 uses the predetermined standby temperature as the target temperature. The standby temperature is selected from the non-liquefaction temperature range. In the embodiment, the standby temperature is set to 260 K. In normal rotation operation in this case, the controller 22 operates the refrigerator 22 at the maximum operating frequency. This causes the cold panel temperature T to drop rapidly, returning the ambient pressure P around the cold trap to the permitted pressure range efficiently.

When the cold panel temperature T sufficiently approximates the standby temperature 260 K or has reached 260 K, the controller 24 places the refrigerator 22 in the standby operation state. For example, the operating frequency of the refrigerator 22 in the standby operation state is selected such that the heat load on the cold trap 10 and the refrigerating capacity of the refrigerator 22 balance and the cold panel temperature T is maintained at the standby temperature accordingly. For example, the refrigerator may be operated in the standby operation state at the minimum operating frequency that allows the refrigerator 22 to be operated stably.

The pressure table shown in FIG. 7 does not output "suspension of operation" as the operation state of the refrigerator 22. This is due to the fact that, it is preferable to cool the cold panel 20 actively by normal rotation operation of the refrigerator 22 instead of natural cooling induced by suspension of operation of the refrigerator 22, when the ambient pressure P around the cold trap is increased.

According to the temperature table shown in FIG. 8 the controller 24 determines the operation state of the refrigerator 22, distinguishing between whether the cold panel temperature T falls below the permitted temperature range, whether the temperature T is within the permitted temperature range, or whether the temperature T exceeds the permitted temperature range. The permitted temperature range is configured similarly to the temperature table for 260 K temperature control shown in FIG. 5. In 320 K temperature control, the target temperature is 320 K so that the permitted temperature range is defined as 310$\leq$T<320 K.

If the cold panel temperature T falls below the permitted temperature range, i.e., below 310 K (the left column of FIG. 8), the controller 24 drives the refrigerator into reverse rotation operation regardless of the current operation state of the refrigerator. If the cold panel temperature T is within the permitted temperature range, i.e., 310 K$\leq$T<320 K (the center column of FIG. 8), the operation state is continued regardless of the current operation state of the refrigerator. If the cold panel temperature T exceeds the permitted temperature range, i.e., equal to or higher than 320 K (the right column of FIG. 8), the controller 24 suspends the operation of the refrigerator regardless of the current operation state of the refrigerator. In this way, the temperature of the cold panel is raised by reverse rotation operation if the cold panel temperature T falls below the permitted temperature range. If the cold panel temperature T exceeds the permitted temperature range, the cold panel is naturally cooled as a result of the suspension of operation.

The pressure table shown in FIG. 8 does not output "normal rotation operation" as the operation state of the refrigerator 22. Since the cold panel temperature T is higher than the ambient temperature, the cold panel 20 is naturally cooled as a result of the suspension of operation. Thus, the panel need not be actively cooled by normal rotation operation.

The final output table shown in FIG. 9 indicates that, when the output from the pressure table is "normal rotation operation", the controller 24 determines the output from the pressure table as the final output regardless of the output from the temperature table. This ensures that the refrigerator 22 is placed in the state of normal rotation operation when the ambient pressure P around the cold trap exceeds the permitted pressure range. As a result, the ambient pressure P around the cold trap is returned to the permitted pressure range. Meanwhile, when the output from the pressure table is "reverse rotation operation" and the output from the temperature table is "suspension of operation", the controller 24 determines "suspension of operation", i.e., the output from the temperature table, as the final output. That the temperature table outputs "suspension of operation" means that the cold panel temperature T is higher than the permitted temperature range and that there is no need to raise the temperature. When the outputs from both the pressure table and the temperature table are "reverse rotation operation", the controller 24 determines "reverse rotation operation" as the final output.

Thus, when 320 K temperature control is started in the second temperature raising step according to the embodiment, the temperature of the cold panel 20 is raised to 320 k, which is the first regeneration temperature, by driving the refrigerator 22 into reverse rotation operation. Since the operating frequency of the refrigerator 22 in this case is lower than the operating frequency during reverse rotation operation in 260 K temperature control, the temperature is raised relatively slowly. When the temperature is raised to 320 K, the operation of the refrigerator 22 is suspended, naturally cooling the panel to 310 K. When the temperature reaches 310 K, the temperature is raised to 320 K again. The steps will be repeated so long as the ambient pressure P around the cold trap remains within the permitted pressure range, until the completion of the high-temperature pumping step.

However, when the ambient pressure P around the cold trap exceeds the permitted pressure range, the refrigerator 22 is driven to produce the maximum output so as to cool the cold panel 20 rapidly to 260 K, which is the standby temperature. Since the standby temperature is within the non-liquefaction temperature range, the gas frozen on the panel is not liquefied or liquefaction is limited to the minimum degree, even if the ambient pressure P around the cold trap exceeds the permitted pressure range. The cold panel temperature T is maintained at the standby temperature until the ambient pressure P around the cold trap falls below the permitted pressure range. After the ambient pressure returns to the permitted pressure range, normal 320 K temperature control is resumed so that the cold panel temperature T is raised by reverse rotation operation to 320 K, which is the first regeneration temperature.

Figure 10:
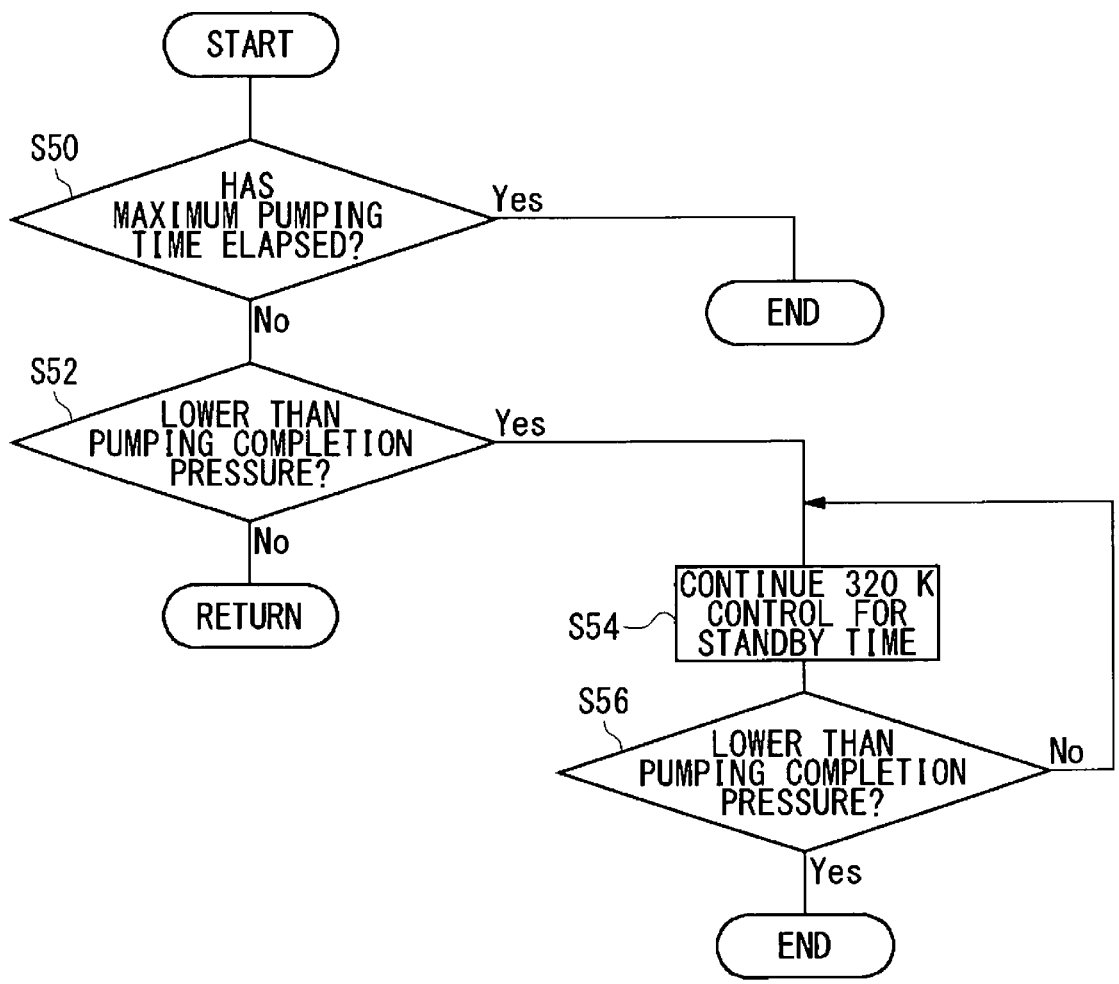
FIG. 10 is a flowchart illustrating the high-temperature pumping step according to the embodiment.

FIG. 10 is a flowchart illustrating the high-temperature pumping step (S22 of FIG. 3) according to the embodiment. In the high-temperature pumping step, 320 K temperature control is continued as in the second temperature raising step. The controller 24 determines whether a maximum pumping time has elapsed (S50) and determines whether the ambient pressure around the cold trap is lower than the pumping completion pressure (S52). Whichever of these steps of determination may precede the other. When the maximum pumping time has not elapsed (No in S50) and when the ambient pressure around the cold trap is equal to or higher the pumping completion pressure (No in S52), the controller 24 repeats these steps of determination at a subsequent point of time in the control schedule.

When it is determined that the maximum pumping time has elapsed (Yes in S50), the controller 24 terminates the high-temperature pumping step and performs a cool-down step (S24 of FIG. 3). The maximum pumping time is a maximum value of time permitted for a high-temperature pumping step and is predefined by and stored in the controller 24. When the maximum pumping time has elapsed, the regeneration process is terminated regardless of whether the ice on the cold panel is completely discharged. Normally, the maximum pumping time is set to be sufficient to completely discharge the ice on the cold panel.

If it is determined that the ambient pressure around the cold trap is lower than the pumping completion pressure (Yes in S52), the controller 24 stands by for a predetermined period of time (S54). The standby time is predefined by and stored in the controller 24. For example, the standby time is set to, for example, several minutes. After the standby time has elapsed, the controller 24 determines for a second time whether the ambient pressure abound the cold trap is lower than the pumping completion pressure (S56). By performing a determination as to the pumping completion pressure after the standby time has elapsed, a premature determination of completion of pumping, which results from an instantaneous drop in the pressure at the time of initial determination as to the pumping completion pressure (S52), can be avoided. If it is determined that the ambient pressure around the cold trap is equal to or higher than the pumping completion pressure in the re-determination (No in S56), the controller 24 stands by for a predetermined period of time again (S54) and performs the determination as to the completion of pumping (S56). If it is determined that the ambient pressure around the cold trap is equal to or lower than the pumping completion pressure in the re-determination (Yes in S56), the controller 24 terminates the high-temperature pumping step and performs a cool-down step (S24 of FIG. 3).

The low-temperature step (S14 of FIG. 3) is performed similarly to the above-mentioned high-temperature pumping step. A difference is that the low-temperature pumping step is performed under 260 K temperature control. Another difference is that the maximum pumping time in the low-temperature pumping step is set to be longer than that of the high-temperature pumping step.

Figure 11:
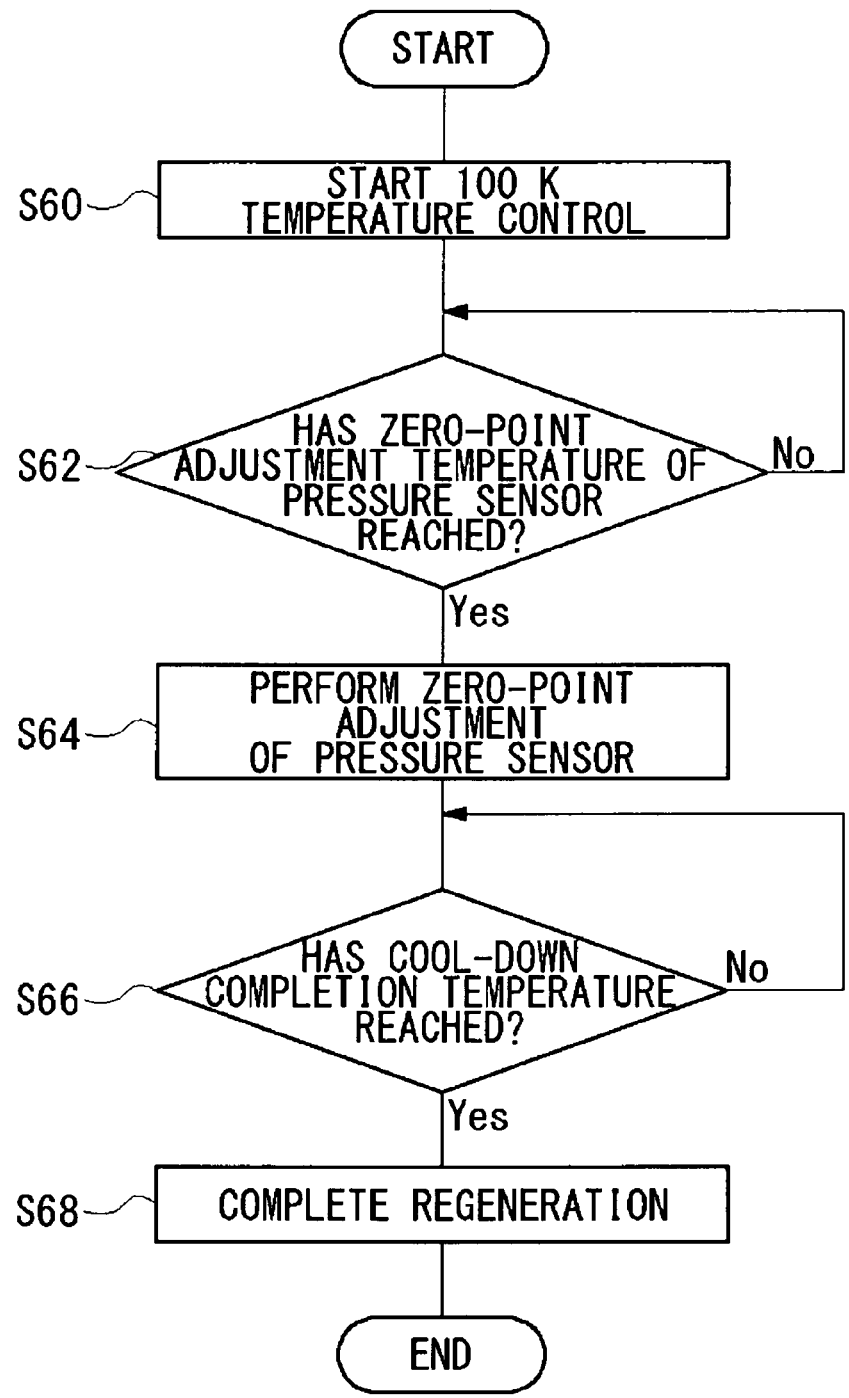
FIG. 11 is a flowchart illustrating the cool-down step according to the embodiment.

FIG. 11 is a flowchart illustrating the cool-down step (S24 of FIG. 3) according to the embodiment. In the cool-down step, the controller 24 starts controlling the temperature of the cold trap 10, targeting a pumping operation temperature (S60). The controller 24 determines the operating frequency of the refrigerator 22 so as to minimize an error between the pumping operation temperature and the cold panel temperature. Since the pumping operation temperature is lower than the regeneration temperature, the cold trap 10 is cooled. The pumping operation temperature is, for example, 100 K.

The controller 24 determines whether the cold panel temperature has reached a zero-point adjustment temperature of the pressure sensor 40 (S62). If it is determined that the cold panel temperature has not reached the zero-point adjustment temperature of the temperature sensor 40 (No in S62), the controller 24 performs the determination again at a subsequent point of time in the control schedule (S62). If it is determined that the cold panel is cooled to the zero-point adjustment temperature of the pressure sensor 40 (Yes in S62), the controller 24 performs zero-point adjustment of the pressure sensor 40 (S64).

Further, the controller 24 determines whether the cold panel temperature T has reached a cool-down completion temperature (S66). If it is determined that the cold panel temperature has not reached the cool-down completion temperature (No in S66), the controller 24 performs the determination again at a subsequent point of time in the control schedule (S66). If it is determined that the cold panel is cooled to the cool-down completion temperature (Yes in S66), the controller 24 determines that the regeneration process is completed and terminates the regeneration process (S68).

The cool-down completion temperature is set to be equal to, for example, the above-mentioned pumping operation temperature. The zero-point adjustment temperature is set to be higher than the cool-down completion temperature by a predetermined margin so that zero-point adjustment is completed before the cool-down step is terminated. Zero-point adjustment of the pressure sensor may be performed in the cool-down step without exception, or performed at appropriate intervals but not each time the cool-down step is performed, or totally omitted. Alternatively, zero-point adjustment may be performed when the ambient pressure around the cold trap is determined to be lower than the pumping completion pressure and the cool-down step is then started accordingly.

Figure 12:
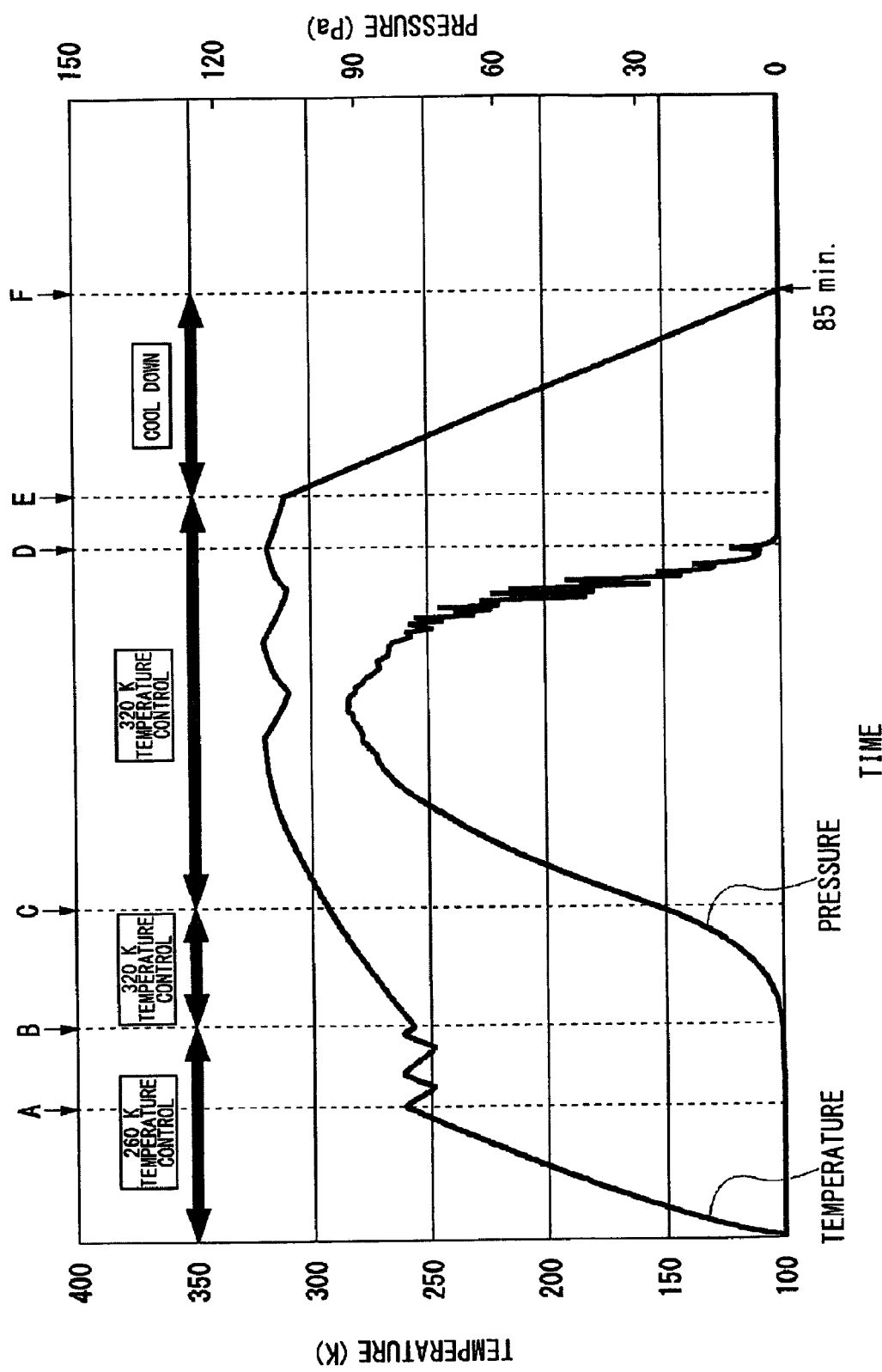
FIG. 12 shows the time variation of the temperature and pressure in the regeneration process according to the embodiment.

According to the regeneration method of the embodiment, the ambient pressure is controlled so that the gas captured by a cold trap is not melted at a relatively high regeneration temperature at which the gas can be melted. In this way, regeneration time is considerably reduced as compared with the related-art low-temperature regeneration. For example, it was experimentally verified that, a regeneration time of 160 minutes required in low-temperature regeneration under 260 K temperature control is reduced by about half to 85 minutes, if the regeneration method according to the embodiment is used in place of low-temperature regeneration. FIG. 12 shows the time variation of the cold panel temperature and ambient pressure around the cold trap.

In the exemplary embodiment shown in FIG. 12, the above-mentioned regeneration process was performed by setting the upper limit and the lower limit of the permitted pressure range of the ambient pressure around the cold trap to 100 Pa and 80 Pa, respectively. The vertical axis of the graph of FIG. 12 indicates the cold panel temperature and ambient pressure around the cold trap, and the horizontal axis indicates time elapsed since the start of the regeneration process.

Referring to FIG. 12, an interval between the start of regeneration and a point of time B marks the first temperature raising step (S10 of FIG. 3, and FIG. 4). When the regeneration process is started, the refrigerator 22 is driven into reverse rotation operation to produce the maximum output so that the cold panel temperature is rapidly raised to the pressure determination temperature (260 K). At a point of time A, the cold panel temperature reaches 260 K. Subsequently, the cold panel temperature is maintained within the permitted temperature range 250 K$\leq$T<260 K in accordance with the temperature table for 260 K temperature control (FIG. 5) until the standby time elapses (S36 of FIG. 4).

At the point of time B when the standby time has elapsed, the first temperature raising step is terminated and the first pressure determination process (S12 of FIG. 3) is performed.

At the point of time B, the ambient pressure around the cold trap is still about 0 Pa, which is lower than the reference pressure (100 Pa). Therefore, the second temperature raising step is then performed (S16 of FIG. 3, FIG. 6). An interval between the point of time B and a point of time C marks the second temperature raising step. In the second temperature raising step, the temperature of the cold panel 20 is raised at a rate slower than that of the first temperature raising step. During the second temperature raising step, the ambient pressure around the cold trap starts to rise. As illustrated, an increase in the ambient pressure around the cold trap is delayed with respect to an increase in the cold panel temperature.

At the point of time C when the standby time (S42 of FIG. 6) has elapsed, the second temperature raising step is terminated and the second pressure determination process (S18 of FIG. 3) is performed. At the point of time C, the cold panel temperature is about 290 K and has not reached the target temperature (320 K) of the second temperature raising step. At the point of time C, the ambient pressure around the cold trap is about 25 Pa, which is higher than the pumping completion pressure (5 Pa). Therefore, the high-temperature pumping step is then performed (S22 of FIG. 3, FIG. 10).

An interval between the point of time C and a point of time E marks the high-temperature pumping step. In the high-temperature pumping step, 320 K temperature control is performed as in the second temperature raising step. Thus, the operation state of the refrigerator 22 is determined in accordance with the pressure table, the temperature table, and the final output table shown in FIGS. 7 through 9 so that the cold panel temperature is controlled accordingly. In the exemplary embodiment, the ambient pressure around the cold trap is about 90 Pa at maximum and does not exceed the upper limit of the permitted pressure range. The final output table (FIG. 9) continues to indicate that the output from the temperature table (FIG. 8) for 320 K temperature control is the final output until the ambient pressure around the cold trap is lower than the pumping completion pressure (5 Pa) (S52 of FIG. 10) at a point of time D. Thereby, the cold panel temperature is maintained at the permitted temperature range 310 K$\leq$T<320 K.

At the point of time E when the standby time (S54 of FIG. 10) has elapsed, the ambient pressure around the cold trap is still lower than the pumping completion pressure (S56 of FIG. 10). Therefore, the high-temperature pumping step is terminated and the cool-down step (S24 of FIG. 3, FIG. 11) is performed at the point of time E. In the cool-down step, the refrigerator 22 is driven into normal rotation operation to produce the maximum output so that the cold pane is rapidly cooled to the pumping operation temperature (100 K). At a point of time F, the cold panel temperature reaches 100 K, whereupon the regeneration process is terminated. The regeneration process is completed in about 85 minutes, which is about half the time required in the related art.

Figure 13:
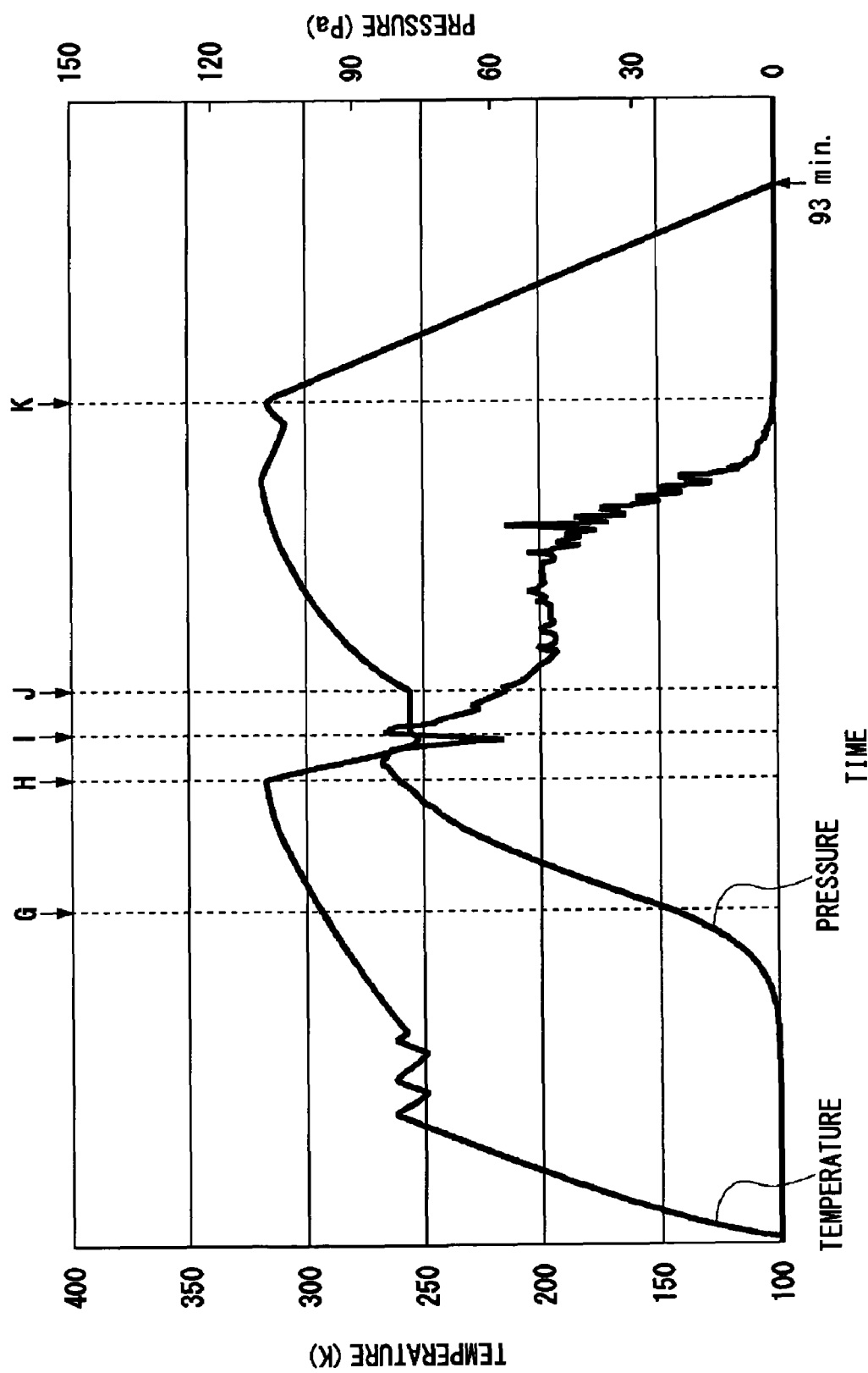
FIG. 13 is a graph showing another example of the time variation of the temperature and pressure in the regeneration process according to the embodiment.

FIG. 13 is a graph showing another example of the time variation of the temperature and pressure in the regeneration process according to the embodiment. In the exemplary embodiment shown in FIG. 13, the above-mentioned regeneration process was performed by setting the upper limit and the lower limit of the permitted pressure range of the ambient pressure around the cold trap to 80 Pa and 60 Pa, respectively. The exemplary embodiment shown in FIG. 13 is the same as the exemplary embodiment shown in FIG. 12 except for the permitted pressure range. As in FIG. 12, the vertical axis of the graph of FIG. 13 indicates the cold panel temperature and ambient pressure around the cold trap, and the horizontal axis indicates time elapsed since the start of the regeneration process.

The exemplary embodiment shown in FIG. 13 differs from the exemplary embodiment shown in FIG. 12 in that the panel is temporarily cooled to the standby temperature in the high-temperature pumping step. Referring to FIG. 13, an interval between a point of time G and a point of time K marks the high-temperature pumping step. In the interval between the point of time G and a point of time H, the cold panel temperature is raised to the first regeneration temperature (320 K). In this process, the output from the temperature table (FIG. 8) for 320 K temperature control is indicated by the final output table (FIG. 9) as being the final output so that the temperature of the cold panel 20 is raised by reverse rotation operation of the refrigerator 22.

At the point of time H, the ambient pressure around the cold trap reaches 80 Pa, which is the upper limit pressure. For this reason, the output from the pressure table (FIG. 7) for 320 K temperature control is indicated by the final output table as being the final output (FIG. 9) so that the operation state of the refrigerator 22 is switched to normal rotation operation and the cold panel is rapidly cooled to the standby temperature (260 K). At a point of time I, when the cold panel is cooled to the standby temperature, the refrigerator 22 is placed in the standby operation state so that the cold panel is maintained at the standby temperature. Subsequently, at a point of time J, the ambient pressure around the cold panel reaches 60 Pa, which is the lower limit pressure. At this point of time, the cold panel is at the standby temperature, which falls below the permitted temperature range. Thus, the pressure table (FIG. 7) for 320 K temperature control outputs "reverse rotation operation" and the temperature table (FIG. 8) for 320 K temperature control also outputs "reverse rotation operation". Accordingly, the operation state of the refrigerator 22 is switched to reverse rotation operation so that the temperature is raised again to the first regeneration temperature. At the point of time K, the ambient pressure around the cold trap is lower than the pumping completion pressure so that the high-temperature pumping step is terminated. The exemplary embodiment shown in FIG. 13 requires a regeneration time of about 93 minutes, which is also remarkably shorter than the time required in the related-art low-temperature regeneration. In yet another variation, the upper limit pressure and the lower limit pressure of the permitted temperature range are lowered to 60 Pa and 40 Pa, respectively. Regeneration was also completed in about 93 minutes.

As described, according to the embodiment, regeneration time is dramatically reduced as compared to the related-art low-temperature regeneration, by regenerating the cold trap 10 while monitoring the temperature and pressure. Since the temperature and pressure are controlled so that the gas frozen on the cold trap 10 is not melted during regeneration, liquid is prevented from dropping from the cold trap 10 onto other equipment such as the turbomolecular pump 12, ensuring that the equipment is not adversely affected. For example, the inventive regeneration prevents damage to equipment caused when the frozen gas is melted and solid objects as well as liquid drop onto the equipment.

What is claimed is:

1. A cold trap provided in a pumping path connecting a volume subject to pumping to a vacuum pump, causing a portion of a gas taken in from the volume to the vacuum pump via the pumping path to be frozen on the surface of the cold trap, and capturing the gas accordingly, the cold trap comprising:
a cold panel provided in the pumping path such that the panel is exposed;
a refrigerator thermally coupled to the cold panel and operative to cool the cold panel; and
a controller configured, in a regeneration process for evaporating a gas frozen on the surface of the cold panel and discharging the gas outside using the vacuum pump, to control the refrigerator so as to raise the temperature of the cold panel to a temperature exceeding a non-liquefaction temperature range and to adjust, at the temperature exceeding the non-liquefaction temperature range, a pressure in the pumping path so that the gas frozen on the surface of the cold panel is evaporated without being melted, the non-liquefaction temperature range being a range in which it is guaranteed that a gas frozen on the surface of the cold trap is evaporated without being melted,
wherein the controller controls the refrigerator so that the pressure in the pumping path does not exceed the pressure at the triple point of the gas frozen on the cold panel,
wherein when the pressure in the pumping path exceeds an upper limit pressure, the controller returns the pressure in the pumping path to a pressure equal to or below the upper limit pressure by cooling the cold panel.

2. The cold trap according to claim 1, wherein
the controller controls the refrigerator so that the pressure in the pumping path does not exceed a permissible inlet pressure of the vacuum pump.

3. The cold trap according to claim 1, wherein
the controller raises the temperature of the cold panel at a slower rate at a temperature exceeding the non-liquefaction temperature range than at a temperature within the non-liquefaction temperature range.

4. The cold trap according to claim 1, further comprising:
a pressure sensor that includes in its measurement range the whole pressure range that could occur in the pumping path in the regeneration process, is provided to measure the pressure in the pumping path, and is connected to the controller so as to output a measured value to the controller, wherein
the controller controls the pressure in the pumping path based on the measured value from the pressure sensor.

5. A cold trap provided in a pumping path connecting a volume subject to pumping to a vacuum pump, causing a portion of a gas taken in from the volume to the vacuum pump via the pumping path to be frozen on the surface of the cold trap, and capturing the gas accordingly, the cold trap comprising:
a cold panel provided in the pumping path such that the panel is exposed;
a refrigerator thermally coupled to the cold panel and operative to cool the cold panel; and
a controller configured, in a regeneration process for evaporating a gas frozen on the surface of the cold panel and discharging the gas outside using the vacuum pump, to control the refrigerator so as to raise the temperature of the cold panel to a temperature exceeding a non-liquefaction temperature range and to adjust, at the temperature exceeding the non-liquefaction temperature range, a pressure in the pumping path so that the gas frozen on the surface of the cold panel is evaporated without being melted, the non-liquefaction temperature range being a range in which it is guaranteed that a gas frozen on the surface of the cold trap is evaporated without being melted,
wherein the controller controls the refrigerator so that the pressure in the pumping path does not exceed the pressure at the triple point of the gas frozen on the cold panel,
wherein when the pressure in the pumping path exceeds a permitted pressure range, the controller cools the cold panel to a standby temperature selected from the non-liquefaction temperature range.

6. The cold trap according to claim 5, wherein
when the pressure in the pumping path falls below the permitted pressure range at the standby temperature, the controller raises the temperature of the cold panel to a temperature exceeding the non-liquefaction temperature range.

7. A cold trap provided in a pumping path connecting a volume subject to pumping to a vacuum pump, causing a portion of a gas taken in from the volume to the vacuum pump via the pumping path to be frozen on the surface of the cold trap, and capturing the gas accordingly, the cold trap comprising:
a cold panel provided in the pumping path such that the panel is exposed;
a refrigerator thermally coupled to the cold panel and operative to cool the cold panel; and
a controller configured, in a regeneration process for evaporating a gas frozen on the surface of the cold panel and discharging the gas outside using the vacuum pump, to control the refrigerator so as to raise the temperature of the cold panel to a temperature exceeding a non-liquefaction temperature range and to adjust, at the temperature exceeding the non-liquefaction temperature range, a pressure in the pumping path so that the gas frozen on the surface of the cold panel is evaporated without being melted, the non-liquefaction temperature range being a range in which it is guaranteed that a gas frozen on the surface of the cold trap is evaporated without being melted,
wherein the controller controls the refrigerator so that the pressure in the pumping path does not exceed the pressure at the triple point of the gas frozen on the cold panel,
wherein the controller raises the temperature of the cold panel to a pressure determination temperature selected from the non-liquefaction temperature range and determines, after the temperature is raised, whether the pressure in the pumping path exceeds a reference pressure, and
when it is determined that the pressure in the pumping path exceeds the reference pressure, the controller cools the cold panel to a temperature selected from the non-liquefaction temperature range, and, when it is determined that the pressure in the pumping path does not exceed the reference pressure, the controller raises the temperature of the cold panel to a temperature exceeding the non-liquefaction temperature range.

8. A cold trap regeneration method for evaporating ice captured on the surface of a cold trap and discharging the ice outside, the method comprising:
raising the temperature of the cold trap to a temperature exceeding a non-liquefaction temperature range in which it is guaranteed that ice frozen on the surface of the cold trap is evaporated without being melted; and
controlling an ambient pressure around the cold trap at the temperature exceeding the non-liquefaction temperature range so that the ice frozen on the surface of the cold trap is evaporated without being melted,
wherein the controlling exercises control so that the ambient pressure around the cold trap does not exceed the pressure at the triple point of water,
wherein when the ambient pressure around the cold trap exceeds an upper limit pressure, the controlling returns the ambient pressure to a pressure equal to or below the upper limit pressure by cooling the cold trap.

9. The regeneration method according to claim 8, wherein the controlling includes discharging water vapor outside using a turbomolecular pump and controlling the ambient pressure around the cold trap so as not to exceed a permissible inlet pressure of the turbomolecular pump.

10. The regeneration method according to claim 8, wherein the raising raises the temperature of the cold trap at a slower rate at a temperature exceeding the non-liquefaction temperature range than at a temperature within the non-liquefaction temperature range.

11. The regeneration method according to claim 8, wherein a single pressure sensor is operative to measure the ambient pressure around the cold trap since the start of the raising through the completion of the controlling.

12. A cold trap regeneration method for evaporating ice captured on the surface of a cold trap and discharging the ice outside, the method comprising:
raising the temperature of the cold trap to a temperature exceeding a non-liquefaction temperature range in which it is guaranteed that ice frozen on the surface of the cold trap is evaporated without being melted; and
controlling an ambient pressure around the cold trap at the temperature exceeding the non-liquefaction temperature range so that the ice frozen on the surface of the cold trap is evaporated without being melted,
wherein the controlling exercises control so that the ambient pressure around the cold trap does not exceed the pressure at the triple point of water,
wherein when the ambient pressure around the cold trap exceeds a permitted pressure range, the controlling cools the cold trap to a standby temperature selected from the non-liquefaction temperature range.

13. The regeneration method according to claim 12, wherein
when the ambient pressure around the cold trap falls below the permitted pressure range at the standby temperature, the controlling raises the temperature of the cold trap to a temperature exceeding the non-liquefaction temperature range.

14. A cold trap regeneration method for evaporating ice captured on the surface of a cold trap and discharging the ice outside, the method comprising:
raising the temperature of the cold trap to a temperature exceeding a non-liquefaction temperature range in which it is guaranteed that ice frozen on the surface of the cold trap is evaporated without being melted; and
controlling an ambient pressure around the cold trap at the temperature exceeding the non-liquefaction temperature range so that the ice frozen on the surface of the cold trap is evaporated without being melted,
wherein the controlling exercises control so that the ambient pressure around the cold trap does not exceed the pressure at the triple point of water,
wherein the raising raises the temperature of the cold trap to a pressure determination temperature selected from the non-liquefaction temperature range and determines, after the temperature is raised, whether the ambient pressure exceeds a reference pressure, and
when it is determined that the ambient pressure exceeds the reference pressure, the ice is allowed to sublimate at a temperature selected from the non-liquefaction temperature range and is discharged outside, and, when it is determined that the ambient pressure does not exceed the reference pressure, the temperature of the cold trap is raised to a temperature exceeding the non-liquefaction temperature range.

15. A regeneration controller adapted to perform a regeneration process for evaporating a gas frozen on the surface of a cold trap and discharging the gas outside, wherein the controller is operative to raise the temperature of the cold trap to a temperature exceeding a non-liquefaction temperature range and to control an ambient pressure around the cold trap at the temperature so that the gas frozen on the surface of the cold trap is evaporated without being melted, the non-liquefaction temperature range being a range in which it is guaranteed that a gas frozen on the surface of the cold trap is evaporated without being melted, the control of the ambient pressure includes allowing temporarily cooling the cold trap when the temperature of the cold trap is raised at the temperature exceeding the non-liquefaction temperature range during regeneration.

16. A cold trap regeneration method for evaporating a gas frozen on the surface of a cold trap and discharging the gas outside, the method comprising:

monitoring an ambient pressure around the cold trap during regeneration; and temporarily cooling the cold trap when the ambient pressure thus monitored exceeds a permitted pressure range.

* * * * *